United States Patent
Kim et al.

(10) Patent No.: US 11,640,381 B2
(45) Date of Patent: May 2, 2023

(54) SYSTEM, DEVICE AND/OR PROCESS FOR HASHING

(71) Applicant: Arm Limited, Cambridge (GB)

(72) Inventors: Gwangsun Kim, Austin, TX (US);
Dam Sunwoo, Austin, TX (US)

(73) Assignee: Arm Limited, Cambridge (GB)

( * ) Notice: Subject to any disclaimer, the term of this patent is extended or adjusted under 35 U.S.C. 154(b) by 415 days.

(21) Appl. No.: 16/519,498

(22) Filed: Jul. 23, 2019

(65) Prior Publication Data
US 2021/0026826 A1    Jan. 28, 2021

(51) Int. Cl.
*G06F 16/22*    (2019.01)

(52) U.S. Cl.
CPC .................. *G06F 16/2255* (2019.01)

(58) Field of Classification Search
CPC ............. G06F 16/2255; G06F 16/9014; G06F 9/3848; G06Q 30/00
USPC ........................................................ 707/747
See application file for complete search history.

(56) References Cited

U.S. PATENT DOCUMENTS

| | | | | |
|---|---|---|---|---|
| 8,938,469 B1* | 1/2015 | Keen | .................... | H04L 45/7453 711/216 |
| 9,020,953 B1* | 4/2015 | Zilmer | .................. | G06F 16/902 707/747 |
| 9,122,705 B1* | 9/2015 | Ioffe | ....................... | G06F 16/583 |
| 9,906,831 B2* | 2/2018 | Chen | ................... | H04N 21/4722 |
| 10,678,778 B1* | 6/2020 | Chalmer | ............. | G06F 16/9535 |
| 11,120,052 B1* | 9/2021 | Ozen | .................... | G06F 16/2255 |
| 2007/0083531 A1* | 4/2007 | Hussain | ................ | H04L 9/0643 |
| 2008/0256094 A1* | 10/2008 | Gupta | .................. | G06F 16/9014 |
| 2014/0330801 A1* | 11/2014 | Kaldewey | ........... | G06F 16/2255 707/698 |
| 2016/0103611 A1* | 4/2016 | Westlund | ............ | H03M 7/3088 711/108 |
| 2016/0132331 A1* | 5/2016 | Godard | ................. | G06F 9/3806 711/137 |
| 2020/0327098 A1* | 10/2020 | Gonczi | ................. | G06F 3/0683 |
| 2020/0342005 A1* | 10/2020 | Kreutzer | ............... | G06F 40/194 |

OTHER PUBLICATIONS

Mare, "Hash Tables: Handling Collisions," CSE 373: Data Structures and Algorithms, Autumn 2018, 32 Pages.
Gunawardena, "Collision Resolution," 15-121 Data Structures, https://www.cs.cmu.edu/~ab/15-121N11/lectures/lecture16.pdf, 2002, 22 Pages.
Nimbe, "An Efficient Strategy for Collision Resolution in Hash Tables," International Journal of Computer Applications (0975-8887), vol. 99, No. 10, Aug. 2014, 8 Pages.
Rahim, "Data Collision Prevention with Overflow Hashing Technique in Closed Hash Searching Process," International Conference on Information and Communication Technology (IconCT), J. Phys.: Conf. Ser. 930 012012, 2017, 6 Pages.

* cited by examiner

*Primary Examiner* — Hicham Skhoun
(74) *Attorney, Agent, or Firm* — Berkeley Law & Technology Group, LLP

(57) ABSTRACT

Briefly, example methods, apparatuses, devices, and/or articles of manufacture are disclosed that may be implemented, in whole or in part, using one or more processing devices to facilitate and/or support one or more operations and/or techniques to access entries in a hash table. In a particular implementation, a hash operation may be selected from between or among multiple hash operations to map key values to entries in a hash table.

20 Claims, 5 Drawing Sheets

SYSTEM, DEVICE AND/OR PROCESS FOR HASHING

BACKGROUND

1. Field

Subject matter disclosed herein relates to implementations of features of a computing system.

2. Information

A hash function or hash operation typically maps a collection of values or parameters of an arbitrary size onto a collection of values or parameters that is of a fixed size. In one example implementation, a hash function or hash operation may implement features of a branch prediction operation of a central process unit (CPU). In another example implementation, a hash function or hash operation may accelerate a lookup operation to a table or other arrangement of values or parameters.

For a hash function or hash operation mapping an arbitrary collection of values to a fixed size collection of entries in a hash table, for example, there is a possibility that the hash function or hash operation does not provide a one-to-one mapping of such an arbitrary collection of values to such a fixed size collection of entries in a hash table. As such, a hash function or hash operation may map two different values in such an arbitrary collection of values to the same entry of a hash table to impart a "collision," which may impair performance of such a hash function or hash operation.

SUMMARY

Briefly, particular implementations are directed to a method comprising: selecting a first hash operation from a plurality of hash operations to be a primary hash operation based, at least in part, on an indicator of collision performance of the first hash operation, wherein a mapping of a key value by the primary hash operation to determine an entry in a hash table to be accessed.

Another particular implementation is directed to an apparatus comprising: a non-transitory memory device to comprise a hash table; and a processor to select a first hash operation from a plurality of hash operations to be a primary hash operation based, at least in part, on an indicator of collision performance of the first hash operation, wherein a mapping of a key value by the primary hash operation to determine an entry in the hash table to be accessed.

Another particular implementation is directed to an article comprising: a storage medium comprising a non-transitory memory comprising computer-readable instructions stored thereon, the instructions to be executable by one or more processors of a computing device to select a first hash operation from a plurality of hash operations to be a primary hash operation based, at least in part, on an indicator of collision performance of the first hash operation, wherein a mapping of a key value by the primary hash operation to determine an entry in a hash table to be accessed.

It should be understood that the aforementioned implementations are merely example implementations, and that claimed subject matter is not necessarily limited to any particular aspect of these example implementations.

BRIEF DESCRIPTION OF THE DRAWINGS

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

Figure 1:
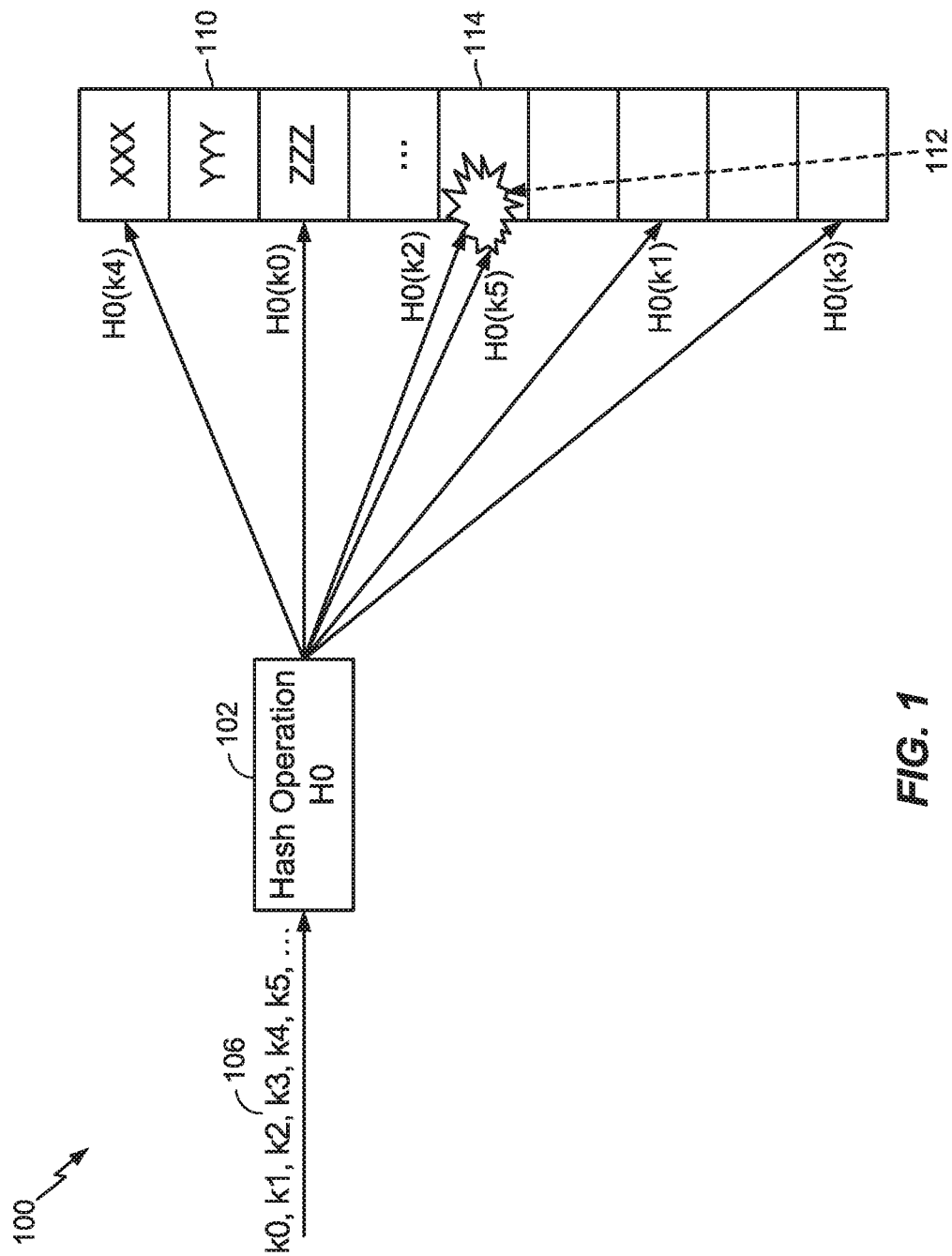
FIG. 1 is a schematic diagram of an implementation of a single hash operation to map a sequence of values to entries in a fixed size hash table according to an embodiment.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment, and/or the like means that a particular feature, structure, characteristic, and/or the like described in relation to a particular implementation and/or embodiment is included in at least one implementation and/or embodiment of claimed subject matter. Thus, appearances of such phrases, for example, in various places throughout this specification are not necessarily intended to refer to the same implementation and/or embodiment or to any one particular implementation and/or embodiment. Furthermore, it is to be understood that particular features, structures, characteristics, and/or the like described are capable of being combined in various ways in one or more implementations and/or embodiments and, therefore, are within intended claim scope. In general, of course, as has always been the case for the specification of a patent application, these and other issues have a potential to vary in a particular context of usage. In other words, throughout the disclosure, particular context of description and/or usage provides helpful guidance regarding reasonable inferences to be drawn; however, likewise, "in this context" in general without further qualification refers at least to the context of the present patent application.

According to an embodiment, hashing may be used in various hardware predictors in processors to quickly look up values in a hash table based, at least in part, on a key value. However, collisions may occur if a hash operation maps two different key values to the same entry of a hash table. In an implementation, a hash operation may reduce such collisions by evenly and/or uniformly spreading mapped key values over entries in a hash table. Nevertheless, it should be understood that there may not be a single best performing hash operation because collision occurrences may also depend on particular key values to be processed and/or mapped to hash table entries. To reduce collisions across different patterns of key values to be mapped to entries of a hash table, performance of multiple different hash operations may be evaluated to enable dynamic and adaptive selection of a "best" performing hash operation.

In one particular embodiment, a hash operation may be implemented in a programmable processing device (e.g., implemented by execution of instructions stored in a non-transitory storage medium) to, for example, access hash table entries formed as a data structure (e.g., formed in a non-transitory memory such as one or more random access memory (RAM) devices). For example, a hash operation may enable faster access of items in a data structure by using a key value that is shorter than a full length index value. In another particular embodiment, a hash operation may be implemented as a feature in a central processing unit (CPU) device such as in a branch predictor to improve performance of such a CPU and related components. It should be understood, however, that these are merely example implementations of a hash operation, and that claimed subject matter is not limited in this respect.

FIG. 1 is a schematic diagram of an implementation 100 of a single hash operation 102 to map a sequence of key values 106 to entries in a fixed size hash table 110 according to an embodiment. According to an embodiment, entries 114 of hash table 110 may be formed as contiguously addressable quantities (e.g., distinct words, bytes or bits) of an addressable memory device (e.g., static random access memory (SRAM) device). Alternatively, entries 114 may comprise an arrangement virtually addressable physical memory locations that are not contiguous. In an implementation, hash operation 102 may map a key value in key value sequence 106 to an entry in hash table 110 according to a mapping function H0. In one implementation, hash operation 102 may map key values to "indices" corresponding to entries in hash table 110. In another implementation, hash operation 102 may map a key value to a physical address of a location in a non-transitory memory or to a virtual address which is translatable to a physical address of a location in a non-transitory memory. In yet another implementation, hash operation 102 may map key values to "pointers" indicative of locations in memory storing contents of entries of hash table 110. In this context, a hash operation may map a key value to an entry in a hash table by computing an index, pointer, physical address and/or virtual address of such an entry in a hash table based, at least in part, such a key value. According to a mapped value determined by hash operation 102, an entry in hash table 110 may be accessed to, for example, read parameters and/or values to or write parameters and/or values to such an accessed entry in hash table 110.

According to an embodiment, hash operation 102 may determine which entry of hash table 110 is mapped to a particular key value in sequence of key values 106 based, at least in part, on a bit pattern making up such a key value (e.g., performing an XOR operation to different bits in a bit pattern making up a key value). In a particular implementation, a size of hash table 110 (e.g., number of addressable entries) may be very small compared to a possible number of unique key values in sequence of key values 106 to be mapped by hash operation 102. As such, multiple different key values may be mapped according to hash operation 102 to the same entry in hash table 110, leading to a "collision" between mapped key values. As shown by example in FIG. 1, key values k2 and k5 in sequence of key values 106 are both mapped by hash operation 102 to entry 114 in hash table 110, resulting in collision 112. While different approaches such as linear probing and chaining have been implemented to reduce collisions in a course of mapping of key value to entries in a hash table, these techniques may add expense and complexity to a design.

Figure 2:
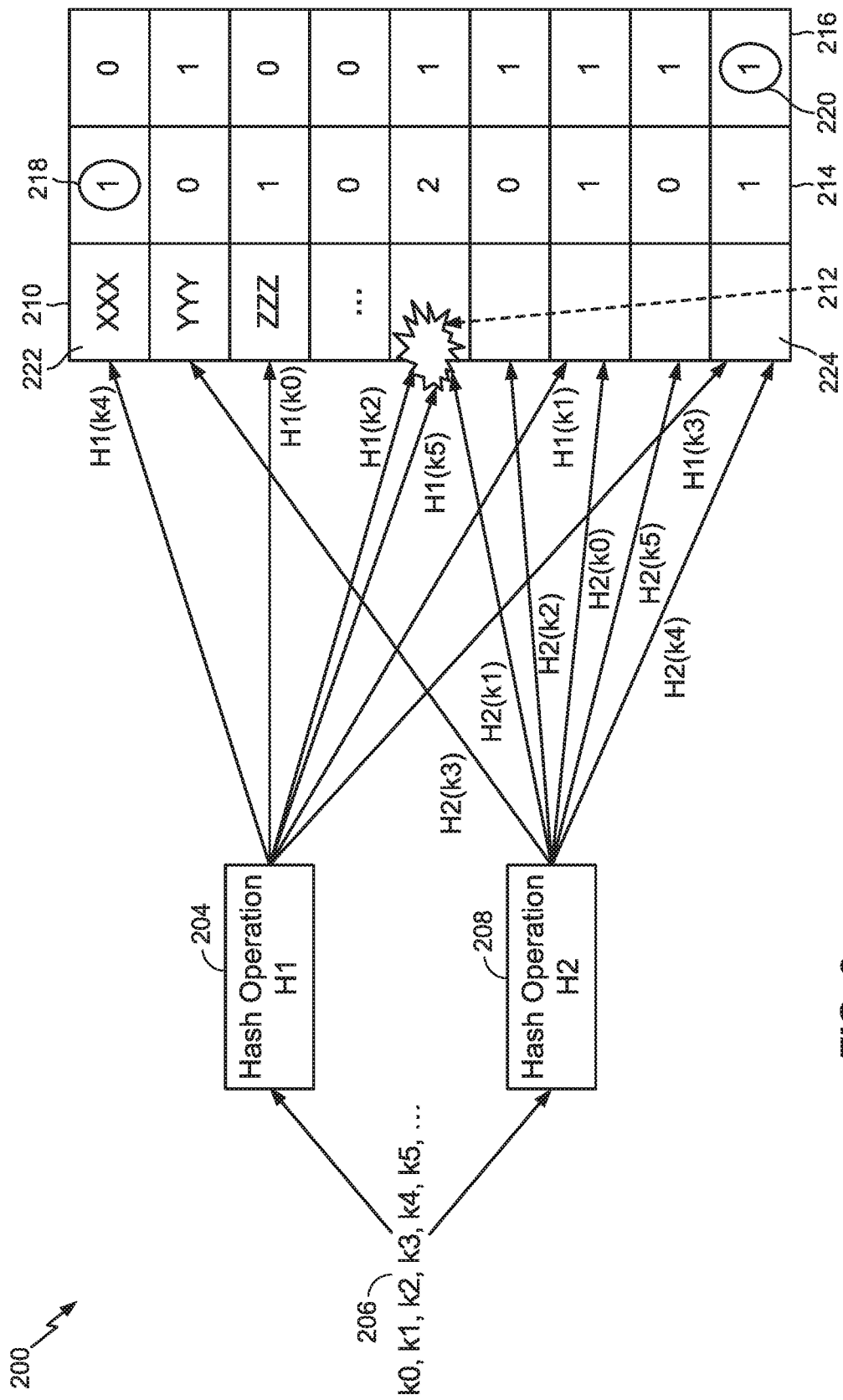
FIG. 2 is a schematic diagram of an implementation of multiple hash functions or hash operations to map a sequence of values to entries in a fixed size hash table according to an embodiment.

FIG. 2 is a schematic diagram of an implementation 200 of multiple hash operations to map a sequence of key values 206 to entries in a fixed size hash table 210 according to an embodiment. In implementation 200 of FIG. 2, collisions may be reduced by selecting a "best" performing hash operation from among multiple different hash operations available for mapping key values in sequence of key values 206 to entries in hash table 210. According to an embodiment, there may not exist one single best performing hash operation for reducing collisions for all possible patterns of key values in sequence of key values 206. For example, there may not be one single hash operation that most effectively and/or uniformly spreads mapped key values across entries of hash table 210 for all possible patterns of key values in key value sequence 206. For example, a first hash operation may perform better at mapping one particular pattern of key values while a second hash operation may perform better at mapping another, different, particular pattern of key values.

For simplicity, implementation 200 is shown to enable selection of a single hash operation from between two available hash operations (hash operation 204 and hash operation 208 as shown) to map key values in key value sequence 206 to entries in hash table 210. It should be understood, however, that features described herein may be similarly applied to implementations that dynamically select a single hash operation from among three or more available hash operations to map key values to entries in a hash table, and that claimed subject matter is not limited in this respect. According to an embodiment, hash operation 204 may map key values in sequence of key values 206 to entries in hash table 210 according to mapping function H1 and hash operation 208 may map key values in sequence of key values 206 to entries in hash table according to mapping function H2.

According to an embodiment, multiple hash operations (e.g., both hash operation 204 and hash operation 208) may compute mappings of key values in key value sequence 206 to entries of hash table 210. However, implementation 200 may designate a single "primary" hash operation from among multiple hash operations that is to compute a mapping of key values to determine which entries in hash table 210 are to be accessed (e.g., for reading parameters and/or values from or writing parameters and/or values to entries in hash table 210). "Non-primary" hash operations comprise other than a primary hash operation that may compute mappings of key values in sequence of key values 206 to entries in hash table 210 but such computed mappings are not be used in accessing entries of hash table 210. While mappings of key values by non-primary hash operations may not be used to determine entries in hash table 210 that are to be accessed, mappings of key values by non-primary hash operations may be used to track collision performance of non-primary hash operations over at least a portion of a sequence of key values as discussed herein.

According to an embodiment, arrays 214 and 216 may maintain counter values indicative of instances of mappings of key values (in key value sequence 206) by hash operations 206 and 208, respectively, to corresponding entries of hash table 210. In this context, a "mapping" as referred to herein means an execution and/or iteration of an operation to associate a value, symbol and/or parameter with one or more other values, symbols and/or parameters. For example, a mapping may comprise execution and/or iteration of an operation (e.g., execution of mapping function H1 or H2) by a hash operation to determine a hash table entry to be associated with a key value. Thus, in a particular implementation, a hash operation may perform multiple mappings based, at least in part, on multiple key values in a sequence of key values. As pointed out above, as a key value in key value sequence 206 is mapped (e.g., to determine an entry in hash table 210 to be accessed), such a key value of key value sequence 206 may be processed by multiple hash operations (e.g., primary and non-primary hash operations and/or both hash operations 204 and 208) to determine mapping results (e.g., expressed as indices, pointers, physical addresses and/or virtual addresses) to corresponding entries of hash table 210. In the example shown, hash operations 204 and 208 may map key values k0, k1, k2, k3, k4 and k5 to entries in table 210 as shown. A counter value of in an entry in array 214 may be incremented based, at least in part, on instances of key values being mapped by hash operation 204 to a corresponding entry in hash table 210. Similarly, a counter value in an entry in array 216 may be incremented based, at least in part, on instances of key values being mapped by hash operation 208 to a corresponding entry in hash table 210. Such a counter value in an entry of array 214 may indicate a count of instances that hash operation 204 has mapped a key value to a corresponding entry of hash table 210. Similarly, a value in an entry of array 216 may indicate a count of instances that hash operation 208 has mapped a key value to a corresponding entry of hash table 210.

In the example shown in FIG. 2, hash operations 204 and 208 may map key values k0, k1, k2, k3, k4 and k5 to entries in table 210 as shown. In mapping to an entry of hash table 210 based, at least in part, on key value k4, hash operation 204 maps key value k4 to entry 222 of hash table 210 while hash operation 208 may map key value k4 to entry 224 of hash table 210. Array 214 reflects mapping of k4 to entry 222 (by hash operation 208) by incrementing a counter value at a corresponding location 218 to "1" while array 216 reflects mapping of k4 to entry 224 (by hash operation 208) by incrementing a counter value at a corresponding location 220 to "1." In mapping to an entry of hash table 210 based on key values k2 and k5, hash operation 204 may map key values k2 and k5 to the same entry 212 in hash table 210, resulting in a collision. Thus, a counter value of "2" is maintained in a corresponding entry of array 214.

According to an embodiment, counter values stored in entries of arrays 214 and 216 may be used to determine scores indicative of collision performance of hash operations 204 and 208. It should be understood, however, that such counter values are merely examples of observations of events that may be used for indicating collision performance of hash operations, that an indication of collision performance may be based on observations of different events, and that claimed subject matter is not limited in this respect.

In one particular implementation, to compare performance of different hash operations, a hash table controller (not shown) may determine a score indicative of collision performance as a difference between maximum and minimum counter values in an array corresponding to a hash operation. In the instant example shown in FIG. 2, an array 214 or 216 having a lowest score may indicate a highest performing hash operation. For array 214, a maximum counter value is "2" and a minimum counter value is "0", providing a score for hash operation 204 of 2−0=2. For array 216, a maximum counter value is "1" and a minimum counter value is "0", providing a score for hash operation 208 of 1−0=1. Having a lowest score, hash operation 208 may be determined to be a best performing hash operation. Thus, hash operation 208 may be selected as a primary hash operation to determine entries of hash table 210 to be accessed based, at least in part, on mappings of key values in key value sequence 206 so as to reduce incidences of collisions (e.g., while hash operation 204 may be maintained as a non-primary hash operation).

In an alternative implementation, other scores indicative of collision performance may be used such as a computed metric indicative of a dispersion of mappings of key values over hash table entries by a hash operation. Such a computed metric indicative of a dispersion of mappings of key values over hash table entries by a hash operation may comprise a computed standard deviation and/or sum of squares, for example. Here, a hash operation mapping key values to hash table entries with a highest degree of dispersion (e.g., highest sum of squares or standard deviation) may be determined to a "best performing" hash operation.

According to an embodiment, entries of hash table 210 and counter values in arrays 214 and 216 may be formed and/or maintained in one or more non-transitory memory devices (e.g., one or more SRAM devices). In an implementation, hash table 210 may be formed as a column of single values that are accessible as hash table entries (e.g., to which a hash operation may map key values). Arrays 214 and 216 may be formed and/or maintained as columns of single counter values which may be smaller than (e.g., fewer number of bits than) values maintained in corresponding entries of hash table 210. In an operation to access an entry in hash table 210, in a particular implementation, access of such an entry in hash table 210 (e.g., to read from or write to the entry) may be limited to a single hash table entry determined and/or located by one particular hash operation (e.g., primary hash operation mapping a key value to the single hash table entry) while counter values in both arrays 214 and 216 may be incremented based, at least in part, on mappings of a key value by both hash operations 204 and 208.

In a particular implementation, there may be limited or insufficient computing resources to update counter values for multiple hash operations (e.g., primary and non-primary hash operations or both hash operations 204 and 208) in a single processing cycle. According to an embodiment, counter values for non-primary hash operations may be updated in subsequent processing cycles if a hash table is not to be accessed every processing cycle. To further reduce a frequency of updates to counter values (e.g. to reduce power), mappings of key values by non-primary hash operations may be performed and observed (e.g., to increment counter values of arrays 214 and/or 216) on selected accesses of hash table entries rather than all accesses of hash table entries.

As a counter value is incremented, such a counter value may eventually reach a maximum counter value (e.g., for a fixed number of bits as in a fixed number of bits of a byte, register etc. for maintaining a counter value). If a counter value rolls over or saturates, however, a score for a corresponding hash operation may over time may not be an accurate or reliable indicator of collision performance. In an implementation, counter values (e.g., maintained in an entry of array 214 or 216) may be scaled down by, for example, uniformly right-shifting bits representing such counter values a certain number of bit positions from time to time. Such a number of bit positions to shift counter values may be chosen to be large enough to avoid scaling too often but small enough to avoid smaller counter values from becoming zero. In an implementation, a number of bit positions to shift counter values may be selected to be a constant and determined based, at least in part, on a design and/or factory setting, or determined dynamically based, at least in part, on current minimum counter values for different particular hash operations. Also, to enable uninterrupted functionality of a hash table while scaling associated counter values, a process of scaling counter values may be limited to execution on idle cycles (e.g., while there are to be no accesses of hash table entries).

Initially (e.g., as part of a computing device reset event or upon initiation of an executable procedure), one of multiple available hash operations (e.g., hash operations 204 and 208) may be randomly selected to be a primary hash operation. Alternatively, an initial primary hash operation may be statically determined (e.g., hard coded) or specified by an algorithm implemented in software and/or firmware. If over time a different, initially unselected (e.g., non-primary) hash operation is observed to have better performance than an initially selected primary hash operation (e.g., based, at least in part on scores indicative of collision performance such as scores based, at least in part, on counter values in arrays 214 and 216 as discussed herein), then such an initially unselected hash operation may replace a hash operation initially selected as a primary hash operation. Entries of a hash table may then be accessed based, at least in part, on mappings of key values by such a newly selected primary hash operation.

In particular implementations, transitions between and/or among different hash operations to act as a primary hash operation for mapping key values to hash table entries may encounter some associated overhead and/or cost (e.g., latency, inefficiency before values and/or parameters stored based on mappings according to a former primary hash operation are written over by values and/or parameters stored based on mappings according to a new primary hash operation, etc.). According to an embodiment, a first hash operation currently acting as a primary hash operation may be replaced by a second hash operation if there is a threshold difference between associated scores indicative of collision performance (e.g., scores associated with first and second hash operations indicate that the second hash operation is performing better than the first hash operation). In a particular implementation, such a replacement of a first hash operation currently acting as a primary hash operation may occur responsive to such a threshold difference being maintained over a time duration and/or number of cycles to access hash table entries. In another implementation, such replacement of a first hash operation currently acting as a primary hash operation may occur at least in part responsive to a multi-threaded workload condition in which a control thread may profile performance of different hash operations as executed on different threads. For example, a best performing hash operation may be selected to be a primary hash operation based, at least in part, on indicators of collision performance (e.g., based, at least in part, on counter values as discussed herein) and/or one or more higher-level performance metrics such as, for example, instructions per cycle (IPC), request throughput, etc., just to provide a few examples of performance metrics. A hash operation selected to be a primary hash operation based, at least in part, on one or more multi-threaded workload conditions may then be applied as a primary hash operation for multiple or all processing threads associated with control thread. Furthermore, selection of a hash operation to replace a hash operation currently acting as a primary hash operation based, at least in part, on a multi-threaded workload condition may be performed over threads executing on multiple different computing platforms and/or machines executing the same workload (e.g., in a data center). For example, one computing platform and/or machine of multiple different computing platforms and/or machines may select a hash operation to be applied as a primary hash operation, and signal to other computing platforms and/or machines to use the selected hash operation as a primary hash operation for threads executing on the other computing platforms and/or machines.

Following transition between a first hash operation to act as a primary hash operation and selection of a second hash operation to act as a primary hash operation, values in entries of a hash table may, for at least a transition duration, store values and/or parameters according to associations of key values to hash table entries determined by the first hash operation. In one implementation, as new values and/or parameters may be written to hash table entries based, at least in part, on mappings of key values by a subsequent primary hash operation, during a transition duration other hash table entries may continue to store values and/or parameters that were previously written according to associations of key values determined according to a former primary hash operation. Over cycles for write access to hash table entries according to mappings of key values by such a subsequent primary hash operation, such stored values and/or parameters (that were previously written according to mappings of key values according to a former primary hash operation) may be written over.

Figure 3:
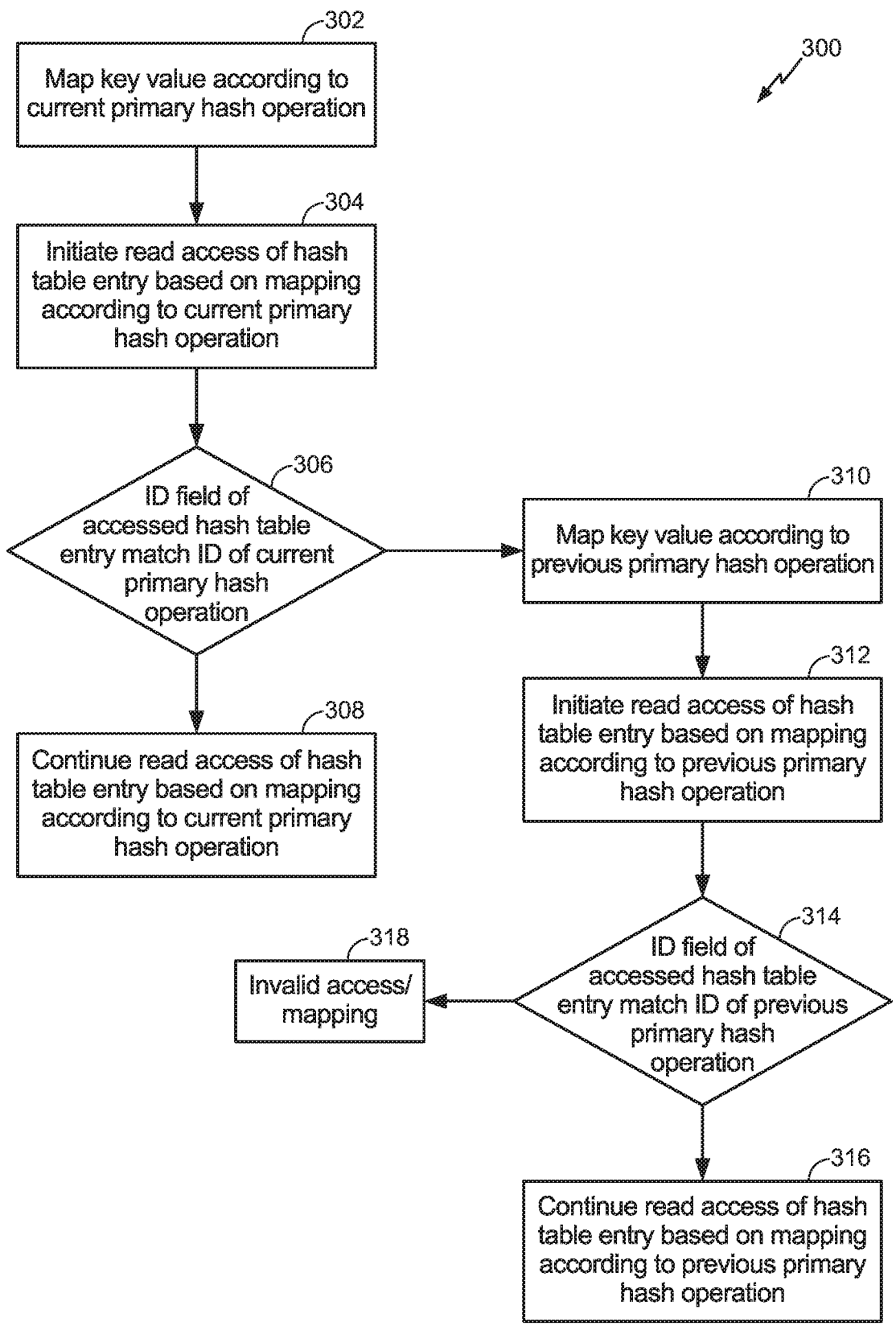
FIG. 3 is a flow diagram of a process to access a hash table entry according to an embodiment.

In an implementation, in addition to storing a value and/or parameter to be accessed for a read operation, a hash table entry may store an associated identifier (ID) in an ID field indicating a hash operation that was most recently used in mapping of a key value for an access to write such a value and/or parameter currently stored in the hash table entry. In other words, an ID in an ID field of a hash table entry may indicate a hash operation that mapped a key value for access to write a value and/or parameter that is currently stored in such a hash table entry. FIG. 3 is directed to a process 300 to access hash table entries to read values and/or parameters following transition between previous use of a first hash operation and subsequent use of a second hash operation as a primary hash operation to map key values for access of hash table entries. As illustrated in process 300 of FIG. 3, block 302 may comprise mapping, according to a current primary hash operation, a key value to a hash table entry that is to be accessed at block 304 to obtain an ID from an ID field. Diamond 306 may determine whether such an ID in an ID field obtained at block 304 matches an ID of a current primary hash operation (e.g., indicating that value and/or parameter currently stored in hash table entry accessed at block 304 was written according to a mapping of a key value by such a current primary hash operation). Responsive to determination at diamond 306 that an ID from an ID field matches an ID of a current primary hash operation, block 308 may continue a read access of a hash table entry initiated at block 304 to obtain a desired stored value and/or parameter.

Otherwise, responsive to determination at diamond 306 that an ID in an ID field does not match an ID of a current primary hash operation, block 310 may map a key value to a hash table entry according to a previous primary hash operation, and block 312 may initiate read access of such a hash table entry to obtain an ID in an ID field. If such an ID in an ID field of a hash table entry accessed at block 312 matches an ID of a previous primary hash operation as determined at diamond 314, block 316 may continue read access of a hash table entry initiated at block 312 to obtain a desired stored value and/or parameter. Otherwise, if diamond 314 determines that such an ID obtained from an ID field at block 312 does not match an ID of a previous primary hash operation, block 318 may comprise an action based on an invalid mapping of a key value.

In an alternative to block 318, if there are one or more additional hash operations, a key value may be mapped to a hash table entry according to such one or more additional hash operations. If a value in an ID field of such a hash table entry matches an ID of such an additional hash operation, access of the hash table entry may continue.

Actions at blocks 310 and 312, and diamond 314 are described as occurring in a sequence following actions at blocks 302 and 304, and diamond 306. In an alternative implementation, actions at blocks 310 and 312, and diamond 314 may occur concurrently with actions at blocks 302 and 304, and diamond 306. Here, either diamond 306 or 314 may determine a match of an ID in an ID field of an accessed hash table entry with an ID of a hash operation to identify a correct hash table entry to be accessed.

Figure 4:
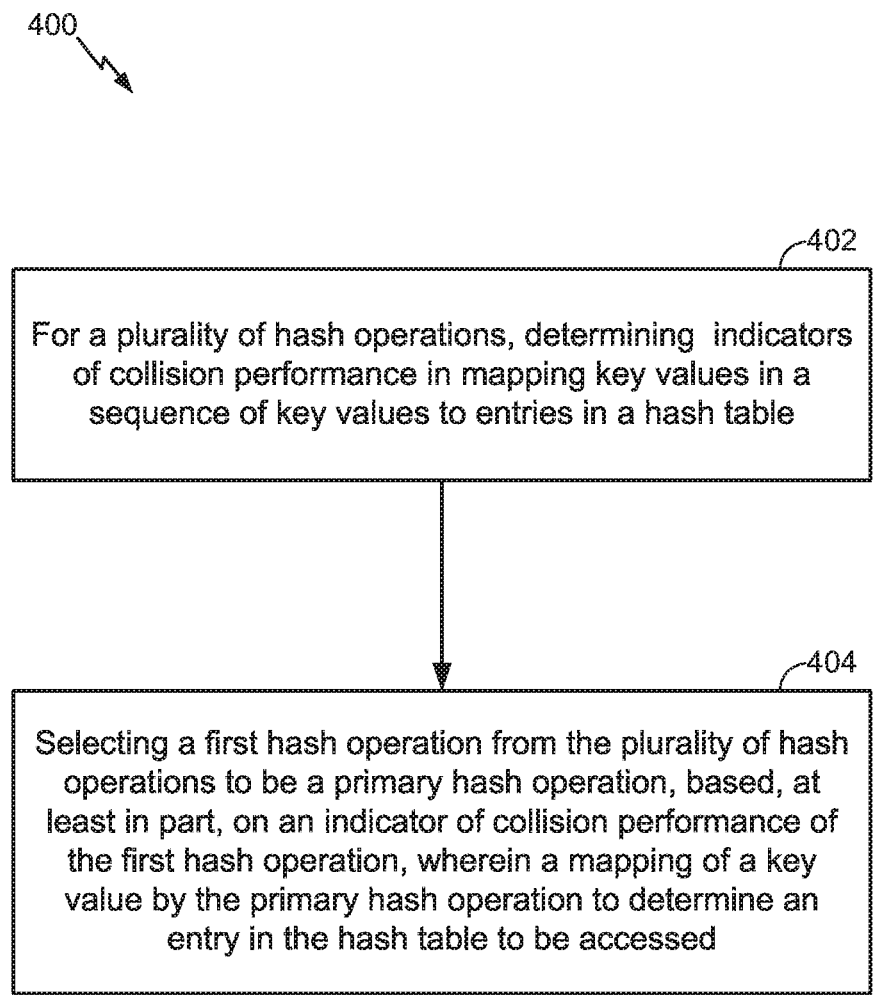
FIG. 4 is a flow diagram of a process to select a hash operation from among multiple hash operations to process key values in a sequence of key values according to an embodiment.

FIG. 4 is a flow diagram of a process 400 to select a hash operation from among multiple hash operations to process hash key values in a sequence of hash key values according to an embodiment. In one implementation, actions shown in FIG. 4 may be performed by hardwired circuitry such as in a controller of a processing circuit (e.g., to perform branch prediction). In another implementation, actions shown in FIG. 4 may be performed by a programmable computing device as controlled by computer-readable instructions fetched from a non-transitory memory.

As pointed out above, multiple hash operations (e.g., hash operations 204 and 208) may be used to map key values in a sequence of key values (e.g., key values in sequence of key values 206) to determine entries in a hash table to be accessed (e.g., for read or write access). Block 402 may comprise, for a plurality of hash operations, determining indicators of collision performance in mapping key values to entries in a hash table. In this context, a "key value" comprises an expression such as an arrangement of one or more symbols, bits, values and/or numerals, etc. In an example implementation, such key values may be arranged in a sequence to be processed one at a time serially. Additionally, a "hash operation" means a procedure to process a key value to relate and/or map such a key value to an entry in a hash table (e.g., map a key value to an entry in a hash table as discussed herein). An "indicator of collision" performance comprises one or more values and/or parameters indicative of a propensity of a hash operation to map different key values to the same entry in a hash table. In an implementation, such an indicator of collision performance may comprise one or more symbols, values and/or other metrics indicative of a dispersion of mappings key values to entries in a hash table. For example, block 402 may comprise determining one or more such indicators of collision performance based, at least in part, by incrementing counter values of instances of mappings of key values by multiple different hash operations to entries in a hash table (e.g., such as incrementing counter values in arrays 214 and 216 responsive to mappings of key values in key value sequence 206 by hash operations 206 and 208, respectively, to corresponding entries of hash table 210 as discussed herein).

Block 404 may comprise selecting a hash operation from among a plurality of hash operations to be a primary hash operation to determine how key values are to be mapped to entries of a hash table that are to be accessed. For example, block 404 may select a particular hash operation to be a primary hash operation based, at least in part, on indicators of collision performance determined at block 402. As pointed out above in a particular implementation, based, at least in part, on counters of instances of mappings of key values to particular entries of a hash table, block 404 may select a hash operation from among a plurality of hash operations (e.g., select a hash operation from hash operations 206 and 208 based, at least in part, on counter values maintained in arrays 214 and 216) that is to be used as a primary hash operation, wherein mappings of key values by such a primary hash operation are to determine entries in a hash table to be accessed (e.g., for read or write operations). For example, block 404 may, for one or more individual available hash operations, determine a difference between minimum and maximum counter values indicative of instances of mappings of key values by a particular hash operation to particular hash table entries.

In the context of the present patent application, the term "connection," the term "component" and/or similar terms are intended to be physical, but are not necessarily always tangible. Whether or not these terms refer to tangible subject matter, thus, may vary in a particular context of usage. As an example, a tangible connection and/or tangible connection path may be made, such as by a tangible, electrical connection, such as an electrically conductive path comprising metal or other conductor, that is able to conduct electrical current between two tangible components. Likewise, a tangible connection path may be at least partially affected and/or controlled, such that, as is typical, a tangible connection path may be open or closed, at times resulting from influence of one or more externally derived signals, such as external currents and/or voltages, such as for an electrical switch. Non-limiting illustrations of an electrical switch include a transistor, a diode, etc. However, a "connection" and/or "component," in a particular context of usage, likewise, although physical, can also be non-tangible, such as a connection between a client and a server over a network, particularly a wireless network, which generally refers to the ability for the client and server to transmit, receive, and/or exchange communications, as discussed in more detail later.

In a particular context of usage, such as a particular context in which tangible components are being discussed, therefore, the terms "coupled" and "connected" are used in a manner so that the terms are not synonymous. Similar terms may also be used in a manner in which a similar intention is exhibited. Thus, "connected" is used to indicate that two or more tangible components and/or the like, for example, are tangibly in direct physical contact. Thus, using the previous example, two tangible components that are electrically connected are physically connected via a tangible electrical connection, as previously discussed. However, "coupled," is used to mean that potentially two or more tangible components are tangibly in direct physical contact.

Nonetheless, "coupled" is also used to mean that two or more tangible components and/or the like are not necessarily tangibly in direct physical contact, but are able to co-operate, liaise, and/or interact, such as, for example, by being "optically coupled." Likewise, the term "coupled" is also understood to mean indirectly connected. It is further noted, in the context of the present patent application, since memory, such as a memory component and/or memory states, is intended to be non-transitory, the term physical, at least if used in relation to memory necessarily implies that such memory components and/or memory states, continuing with the example, are tangible.

Unless otherwise indicated, in the context of the present patent application, the term "or" if used to associate a list, such as A, B, or C, is intended to mean A, B, and C, here used in the inclusive sense, as well as A, B, or C, here used in the exclusive sense. With this understanding, "and" is used in the inclusive sense and intended to mean A, B, and C; whereas "and/or" can be used in an abundance of caution to make clear that all of the foregoing meanings are intended, although such usage is not required. In addition, the term "one or more" and/or similar terms is used to describe any feature, structure, characteristic, and/or the like in the singular, "and/or" is also used to describe a plurality and/or some other combination of features, structures, characteristics, and/or the like. Likewise, the term "based on" and/or similar terms are understood as not necessarily intending to convey an exhaustive list of factors, but to allow for existence of additional factors not necessarily expressly described.

Furthermore, it is intended, for a situation that relates to implementation of claimed subject matter and is subject to testing, measurement, and/or specification regarding degree, that the particular situation be understood in the following manner. As an example, in a given situation, assume a value of a physical property is to be measured. If alternatively reasonable approaches to testing, measurement, and/or specification regarding degree, at least with respect to the property, continuing with the example, is reasonably likely to occur to one of ordinary skill, at least for implementation purposes, claimed subject matter is intended to cover those alternatively reasonable approaches unless otherwise expressly indicated. As an example, if a plot of measurements over a region is produced and implementation of claimed subject matter refers to employing a measurement of slope over the region, but a variety of reasonable and alternative techniques to estimate the slope over that region exist, claimed subject matter is intended to cover those reasonable alternative techniques unless otherwise expressly indicated.

To the extent claimed subject matter is related to one or more particular measurements, such as with regard to physical manifestations capable of being measured physically, such as, without limit, temperature, pressure, voltage, current, electromagnetic radiation, etc., it is believed that claimed subject matter does not fall within the abstract idea judicial exception to statutory subject matter. Rather, it is asserted, that physical measurements are not mental steps and, likewise, are not abstract ideas.

It is noted, nonetheless, that a typical measurement model employed is that one or more measurements may respectively comprise a sum of at least two components. Thus, for a given measurement, for example, one component may comprise a deterministic component, which in an ideal sense, may comprise a physical value (e.g., sought via one or more measurements), often in the form of one or more signals, signal samples and/or states, and one component may comprise a random component, which may have a variety of sources that may be challenging to quantify. At times, for example, lack of measurement precision may affect a given measurement. Thus, for claimed subject matter, a statistical or stochastic model may be used in addition to a deterministic model as an approach to identification and/or prediction regarding one or more measurement values that may relate to claimed subject matter.

For example, a relatively large number of measurements may be collected to better estimate a deterministic component. Likewise, if measurements vary, which may typically occur, it may be that some portion of a variance may be explained as a deterministic component, while some portion of a variance may be explained as a random component. Typically, it is desirable to have stochastic variance associated with measurements be relatively small, if feasible. That is, typically, it may be preferable to be able to account for a reasonable portion of measurement variation in a deterministic manner, rather than a stochastic matter as an aid to identification and/or predictability.

Along these lines, a variety of techniques have come into use so that one or more measurements may be processed to better estimate an underlying deterministic component, as well as to estimate potentially random components. These techniques, of course, may vary with details surrounding a given situation. Typically, however, more complex problems may involve use of more complex techniques. In this regard, as alluded to above, one or more measurements of physical manifestations may be modelled deterministically and/or stochastically. Employing a model permits collected measurements to potentially be identified and/or processed, and/or potentially permits estimation and/or prediction of an underlying deterministic component, for example, with respect to later measurements to be taken. A given estimate may not be a perfect estimate; however, in general, it is expected that on average one or more estimates may better reflect an underlying deterministic component, for example, if random components that may be included in one or more obtained measurements, are considered. Practically speaking, of course, it is desirable to be able to generate, such as through estimation approaches, a physically meaningful model of processes affecting measurements to be taken.

In some situations, however, as indicated, potential influences may be complex. Therefore, seeking to understand appropriate factors to consider may be particularly challenging. In such situations, it is, therefore, not unusual to employ heuristics with respect to generating one or more estimates. Heuristics refers to use of experience related approaches that may reflect realized processes and/or realized results, such as with respect to use of historical measurements, for example. Heuristics, for example, may be employed in situations where more analytical approaches may be overly complex and/or nearly intractable. Thus, regarding claimed subject matter, an innovative feature may include, in an example embodiment, heuristics that may be employed, for example, to estimate and/or predict one or more measurements.

It is further noted that the terms "type" and/or "like," if used, such as with a feature, structure, characteristic, and/or the like, using "optical" or "electrical" as simple examples, means at least partially of and/or relating to the feature, structure, characteristic, and/or the like in such a way that presence of minor variations, even variations that might otherwise not be considered fully consistent with the feature, structure, characteristic, and/or the like, do not in general prevent the feature, structure, characteristic, and/or the like from being of a "type" and/or being "like," (such as being an "optical-type" or being "optical-like," for example) if the minor variations are sufficiently minor so that the feature, structure, characteristic, and/or the like would still be considered to be substantially present with such variations also present. Thus, continuing with this example, the terms optical-type and/or optical-like properties are necessarily intended to include optical properties. Likewise, the terms electrical-type and/or electrical-like properties, as another example, are necessarily intended to include electrical properties. It should be noted that the specification of the present patent application merely provides one or more illustrative examples and claimed subject matter is intended to not be limited to one or more illustrative examples; however, again, as has always been the case with respect to the specification of a patent application, particular context of description and/or usage provides helpful guidance regarding reasonable inferences to be drawn.

With advances in technology, it has become more typical to employ distributed computing and/or communication approaches in which portions of a process, such as signal processing of signal samples, for example, may be allocated among various devices, including one or more client devices and/or one or more server devices, via a computing and/or communications network, for example. A network may comprise two or more devices, such as network devices and/or computing devices, and/or may couple devices, such as network devices and/or computing devices, so that signal communications, such as in the form of signal packets and/or signal frames (e.g., comprising one or more signal samples), for example, may be exchanged, such as between a server device and/or a client device, as well as other types of devices, including between wired and/or wireless devices coupled via a wired and/or wireless network, for example.

In the context of the present patent application, the term network device refers to any device capable of communicating via and/or as part of a network and may comprise a computing device. While network devices may be capable of communicating signals (e.g., signal packets and/or frames), such as via a wired and/or wireless network, they may also be capable of performing operations associated with a computing device, such as arithmetic and/or logic operations, processing and/or storing operations (e.g., storing signal samples), such as in memory as tangible, physical memory states, and/or may, for example, operate as a server device and/or a client device in various embodiments. Network devices capable of operating as a server device, a client device and/or otherwise, may include, as examples, dedicated rack-mounted servers, desktop computers, laptop computers, set top boxes, tablets, netbooks, smart phones, wearable devices, integrated devices combining two or more features of the foregoing devices, and/or the like, or any combination thereof. As mentioned, signal packets and/or frames, for example, may be exchanged, such as between a server device and/or a client device, as well as other types of devices, including between wired and/or wireless devices coupled via a wired and/or wireless network, for example, or any combination thereof. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices and/or one or more server devices, as appropriate.

Along similar lines, references to a "database" are understood to mean, one or more databases and/or portions thereof, as appropriate.

It should be understood that for ease of description, a network device (also referred to as a networking device) may be embodied and/or described in terms of a computing device and vice-versa. However, it should further be understood that this description should in no way be construed so that claimed subject matter is limited to one embodiment, such as only a computing device and/or only a network device, but, instead, may be embodied as a variety of devices or combinations thereof, including, for example, one or more illustrative examples.

A network may also include now known, and/or to be later developed arrangements, derivatives, and/or improvements, including, for example, past, present and/or future mass storage, such as network attached storage (NAS), a storage area network (SAN), and/or other forms of device readable media, for example. A network may include a portion of the Internet, one or more local area networks (LANs), one or more wide area networks (WANs), wire-line type connections, wireless type connections, other connections, or any combination thereof. Thus, a network may be worldwide in scope and/or extent. Likewise, sub-networks, such as may employ differing architectures and/or may be substantially compliant and/or substantially compatible with differing protocols, such as network computing and/or communications protocols (e.g., network protocols), may interoperate within a larger network.

In the context of the present patent application, the term sub-network and/or similar terms, if used, for example, with respect to a network, refers to the network and/or a part thereof. Sub-networks may also comprise links, such as physical links, connecting and/or coupling nodes, so as to be capable to communicate signal packets and/or frames between devices of particular nodes, including via wired links, wireless links, or combinations thereof. Various types of devices, such as network devices and/or computing devices, may be made available so that device interoperability is enabled and/or, in at least some instances, may be transparent. In the context of the present patent application, the term "transparent," if used with respect to devices of a network, refers to devices communicating via the network in which the devices are able to communicate via one or more intermediate devices, such as one or more intermediate nodes, but without the communicating devices necessarily specifying the one or more intermediate nodes and/or the one or more intermediate devices of the one or more intermediate nodes and/or, thus, may include within the network the devices communicating via the one or more intermediate nodes and/or the one or more intermediate devices of the one or more intermediate nodes, but may engage in signal communications as if such intermediate nodes and/or intermediate devices are not necessarily involved. For example, a router may provide a link and/or connection between otherwise separate and/or independent LANs.

In the context of the present patent application, a "private network" refers to a particular, limited set of devices, such as network devices and/or computing devices, able to communicate with other devices, such as network devices and/or computing devices, in the particular, limited set, such as via signal packet and/or signal frame communications, for example, without a need for re-routing and/or redirecting signal communications. A private network may comprise a stand-alone network; however, a private network may also comprise a subset of a larger network, such as, for example, without limitation, all or a portion of the Internet. Thus, for example, a private network "in the cloud" may refer to a private network that comprises a subset of the Internet. Although signal packet and/or frame communications (e.g. signal communications) may employ intermediate devices of intermediate nodes to exchange signal packets and/or signal frames, those intermediate devices may not necessarily be included in the private network by not being a source or designated destination for one or more signal packets and/or signal frames, for example. It is understood in the context of the present patent application that a private network may direct outgoing signal communications to devices not in the private network, but devices outside the private network may not necessarily be able to direct inbound signal communications to devices included in the private network.

The Internet refers to a decentralized global network of interoperable networks that comply with the Internet Protocol (IP). It is noted that there are several versions of the Internet Protocol. The term Internet Protocol, IP, and/or similar terms are intended to refer to any version, now known and/or to be later developed. The Internet includes local area networks (LANs), wide area networks (WANs), wireless networks, and/or long haul public networks that, for example, may allow signal packets and/or frames to be communicated between LANs. The term World Wide Web (WWW or Web) and/or similar terms may also be used, although it refers to a part of the Internet that complies with the Hypertext Transfer Protocol (HTTP). For example, network devices may engage in an HTTP session through an exchange of appropriately substantially compatible and/or substantially compliant signal packets and/or frames. It is noted that there are several versions of the Hypertext Transfer Protocol. The term Hypertext Transfer Protocol, HTTP, and/or similar terms are intended to refer to any version, now known and/or to be later developed. It is likewise noted that in various places in this document substitution of the term Internet with the term World Wide Web ("Web") may be made without a significant departure in meaning and may, therefore, also be understood in that manner if the statement would remain correct with such a substitution.

The term electronic file and/or the term electronic document are used throughout this document to refer to a set of stored memory states and/or a set of physical signals associated in a manner so as to thereby at least logically form a file (e.g., electronic) and/or an electronic document. That is, it is not meant to implicitly reference a particular syntax, format and/or approach used, for example, with respect to a set of associated memory states and/or a set of associated physical signals. If a particular type of file storage format and/or syntax, for example, is intended, it is referenced expressly. It is further noted an association of memory states, for example, may be in a logical sense and not necessarily in a tangible, physical sense. Thus, although signal and/or state components of a file and/or an electronic document, for example, are to be associated logically, storage thereof, for example, may reside in one or more different places in a tangible, physical memory, in an embodiment.

A Hyper Text Markup Language ("HTML"), for example, may be utilized to specify digital content and/or to specify a format thereof, such as in the form of an electronic file and/or an electronic document, such as a Web page, Web site, etc., for example. An Extensible Markup Language ("XML") may also be utilized to specify digital content and/or to specify a format thereof, such as in the form of an electronic file and/or an electronic document, such as a Web page, Web site, etc., in an embodiment. Of course, HTML and/or XML are merely examples of "markup" languages, provided as non-limiting illustrations. Furthermore, HTML and/or XML are intended to refer to any version, now known and/or to be later developed, of these languages. Likewise, claimed subject matter are not intended to be limited to examples provided as illustrations, of course.

In the context of the present patent application, the terms "entry," "electronic entry," "document," "electronic document," "content,", "digital content," "item," and/or similar terms are meant to refer to signals and/or states in a physical format, such as a digital signal and/or digital state format, e.g., that may be perceived by a user if displayed, played, tactilely generated, etc. and/or otherwise executed by a device, such as a digital device, including, for example, a computing device, but otherwise might not necessarily be readily perceivable by humans (e.g., if in a digital format). Likewise, in the context of the present patent application, digital content provided to a user in a form so that the user is able to readily perceive the underlying content itself (e.g., content presented in a form consumable by a human, such as hearing audio, feeling tactile sensations and/or seeing images, as examples) is referred to, with respect to the user, as "consuming" digital content, "consumption" of digital content, "consumable" digital content and/or similar terms. For one or more embodiments, an electronic document and/or an electronic file may comprise a Web page of code (e.g., computer instructions) in a markup language executed or to be executed by a computing and/or networking device, for example. In another embodiment, an electronic document and/or electronic file may comprise a portion and/or a region of a Web page. However, claimed subject matter is not intended to be limited in these respects.

Also, for one or more embodiments, an electronic document and/or electronic file may comprise a number of components. As previously indicated, in the context of the present patent application, a component is physical, but is not necessarily tangible. As an example, components with reference to an electronic document and/or electronic file, in one or more embodiments, may comprise text, for example, in the form of physical signals and/or physical states (e.g., capable of being physically displayed). Typically, memory states, for example, comprise tangible components, whereas physical signals are not necessarily tangible, although signals may become (e.g., be made) tangible, such as if appearing on a tangible display, for example, as is not uncommon. Also, for one or more embodiments, components with reference to an electronic document and/or electronic file may comprise a graphical object, such as, for example, an image, such as a digital image, and/or sub-objects, including attributes thereof, which, again, comprise physical signals and/or physical states (e.g., capable of being tangibly displayed). In an embodiment, digital content may comprise, for example, text, images, audio, video, and/or other types of electronic documents and/or electronic files, including portions thereof, for example.

Also, in the context of the present patent application, the term "parameters" (e.g., one or more parameters), "values" (e.g., one or more values), "symbols" (e.g., one or more symbols) "bits" (e.g., one or more bits), "elements" (e.g., one or more elements), "characters" (e.g., one or more characters), "numbers" (e.g., one or more numbers), "numerals" (e.g., one or more numerals), "indicators" (e.g., one or more indicators), "scores" (e.g., one or more scores), "metrics" (e.g., one or more metrics) or "measurements" (e.g., one or more measurements) refer to material descriptive of a collection of signals, such as in one or more electronic documents and/or electronic files, and exist in the form of physical signals and/or physical states, such as memory states. For example, one or more parameters, values, symbols, bits, elements, characters, numbers, numerals, indicators, scores, metrics or measurements, such as referring to one or more aspects of an electronic document and/or an electronic file comprising an image, may include, as examples, time of day at which an image was captured, latitude and longitude of an image capture device, such as a camera, for example, etc. In another example, one or more parameters, values, symbols, bits, elements, characters, numbers, numerals, indicators, scores, metrics or measurements, relevant to digital content, such as digital content comprising a technical article, as an example, may include one or more authors, for example. Claimed subject matter is intended to embrace meaningful, descriptive parameters, values, symbols, bits, elements, characters, numbers, numerals, indicators, scores, metrics or measurements in any format, so long as the one or more parameters, values, symbols, bits, elements, characters, numbers, numerals, indicators, scores, metrics or measurements comprise physical signals and/or states, which may include, as parameter, value, symbol bits, elements, characters, numbers, numerals or measurements examples, collection name (e.g., electronic file and/or electronic document identifier name), technique of creation, purpose of creation, time and date of creation, logical path if stored, coding formats (e.g., type of computer instructions, such as a markup language) and/or standards and/or specifications used so as to be protocol compliant (e.g., meaning substantially compliant and/or substantially compatible) for one or more uses, and so forth.

Signal packet communications and/or signal frame communications, also referred to as signal packet transmissions and/or signal frame transmissions (or merely "signal packets" or "signal frames"), may be communicated between nodes of a network, where a node may comprise one or more network devices and/or one or more computing devices, for example. As an illustrative example, but without limitation, a node may comprise one or more sites employing a local network address, such as in a local network address space. Likewise, a device, such as a network device and/or a computing device, may be associated with that node. It is also noted that in the context of this patent application, the term "transmission" is intended as another term for a type of signal communication that may occur in any one of a variety of situations. Thus, it is not intended to imply a particular directionality of communication and/or a particular initiating end of a communication path for the "transmission" communication. For example, the mere use of the term in and of itself is not intended, in the context of the present patent application, to have particular implications with respect to the one or more signals being communicated, such as, for example, whether the signals are being communicated "to" a particular device, whether the signals are being communicated "from" a particular device, and/or regarding which end of a communication path may be initiating communication, such as, for example, in a "push type" of signal transfer or in a "pull type" of signal transfer. In the context of the present patent application, push and/or pull type signal transfers are distinguished by which end of a communications path initiates signal transfer.

Thus, a signal packet and/or frame may, as an example, be communicated via a communication channel and/or a communication path, such as comprising a portion of the Internet and/or the Web, from a site via an access node coupled to the Internet or vice-versa. Likewise, a signal packet and/or frame may be forwarded via network nodes to a target site coupled to a local network, for example. A signal packet and/or frame communicated via the Internet and/or the Web, for example, may be routed via a path, such as either being "pushed" or "pulled," comprising one or more gateways, servers, etc. that may, for example, route a signal packet and/or frame, such as, for example, substantially in accordance with a target and/or destination address and availability of a network path of network nodes to the target and/or destination address. Although the Internet and/or the Web comprise a network of interoperable networks, not all of those interoperable networks are necessarily available and/or accessible to the public.

In the context of the particular patent application, a network protocol, such as for communicating between devices of a network, may be characterized, at least in part, substantially in accordance with a layered description, such as the so-called Open Systems Interconnection (OSI) seven layer type of approach and/or description. A network computing and/or communications protocol (also referred to as a network protocol) refers to a set of signaling conventions, such as for communication transmissions, for example, as may take place between and/or among devices in a network. In the context of the present patent application, the term "between" and/or similar terms are understood to include "among" if appropriate for the particular usage and vice-versa. Likewise, in the context of the present patent application, the terms "compatible with," "comply with" and/or similar terms are understood to respectively include substantial compatibility and/or substantial compliance.

A network protocol, such as protocols characterized substantially in accordance with the aforementioned OSI description, has several layers. These layers are referred to as a network stack. Various types of communications (e.g., transmissions), such as network communications, may occur across various layers. A lowest level layer in a network stack, such as the so-called physical layer, may characterize how symbols (e.g., bits and/or bytes) are communicated as one or more signals (and/or signal samples) via a physical medium (e.g., twisted pair copper wire, coaxial cable, fiber optic cable, wireless air interface, combinations thereof, etc.). Progressing to higher-level layers in a network protocol stack, additional operations and/or features may be available via engaging in communications that are substantially compatible and/or substantially compliant with a particular network protocol at these higher-level layers. For example, higher-level layers of a network protocol may, for example, affect device permissions, user permissions, etc.

A network and/or sub-network, in an embodiment, may communicate via signal packets and/or signal frames, such as via participating digital devices and may be substantially compliant and/or substantially compatible with, but is not limited to, now known and/or to be developed, versions of any of the following network protocol stacks: ARCNET, AppleTalk, ATM, Bluetooth, DECnet, Ethernet, FDDI, Frame Relay, HIPPI, IEEE 1394, IEEE 802.11, IEEE-488, Internet Protocol Suite, IPX, Myrinet, OSI Protocol Suite, QsNet, RS-232, SPX, System Network Architecture, Token Ring, USB, and/or X.25. A network and/or sub-network may employ, for example, a version, now known and/or later to be developed, of the following: TCP/IP, UDP, DECnet, NetBEUI, IPX, AppleTalk and/or the like. Versions of the Internet Protocol (IP) may include IPv4, IPv6, and/or other later to be developed versions.

Regarding aspects related to a network, including a communications and/or computing network, a wireless network may couple devices, including client devices, with the network. A wireless network may employ stand-alone, ad-hoc networks, mesh networks, Wireless LAN (WLAN)

networks, cellular networks, and/or the like. A wireless network may further include a system of terminals, gateways, routers, and/or the like coupled by wireless radio links, and/or the like, which may move freely, randomly and/or organize themselves arbitrarily, such that network topology may change, at times even rapidly. A wireless network may further employ a plurality of network access technologies, including a version of Long Term Evolution (LTE), WLAN, Wireless Router (WR) mesh, 2nd, 3rd, or 4th generation (2G, 3G, 4G or 5G) cellular technology and/or the like, whether currently known and/or to be later developed. Network access technologies may enable wide area coverage for devices, such as computing devices and/or network devices, with varying degrees of mobility, for example.

A network may enable radio frequency and/or other wireless type communications via a wireless network access technology and/or air interface, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, ultra-wideband (UWB), 802.11b/g/n, and/or the like. A wireless network may include virtually any type of now known and/or to be developed wireless communication mechanism and/or wireless communications protocol by which signals may be communicated between devices, between networks, within a network, and/or the like, including the foregoing, of course.

Figure 5:
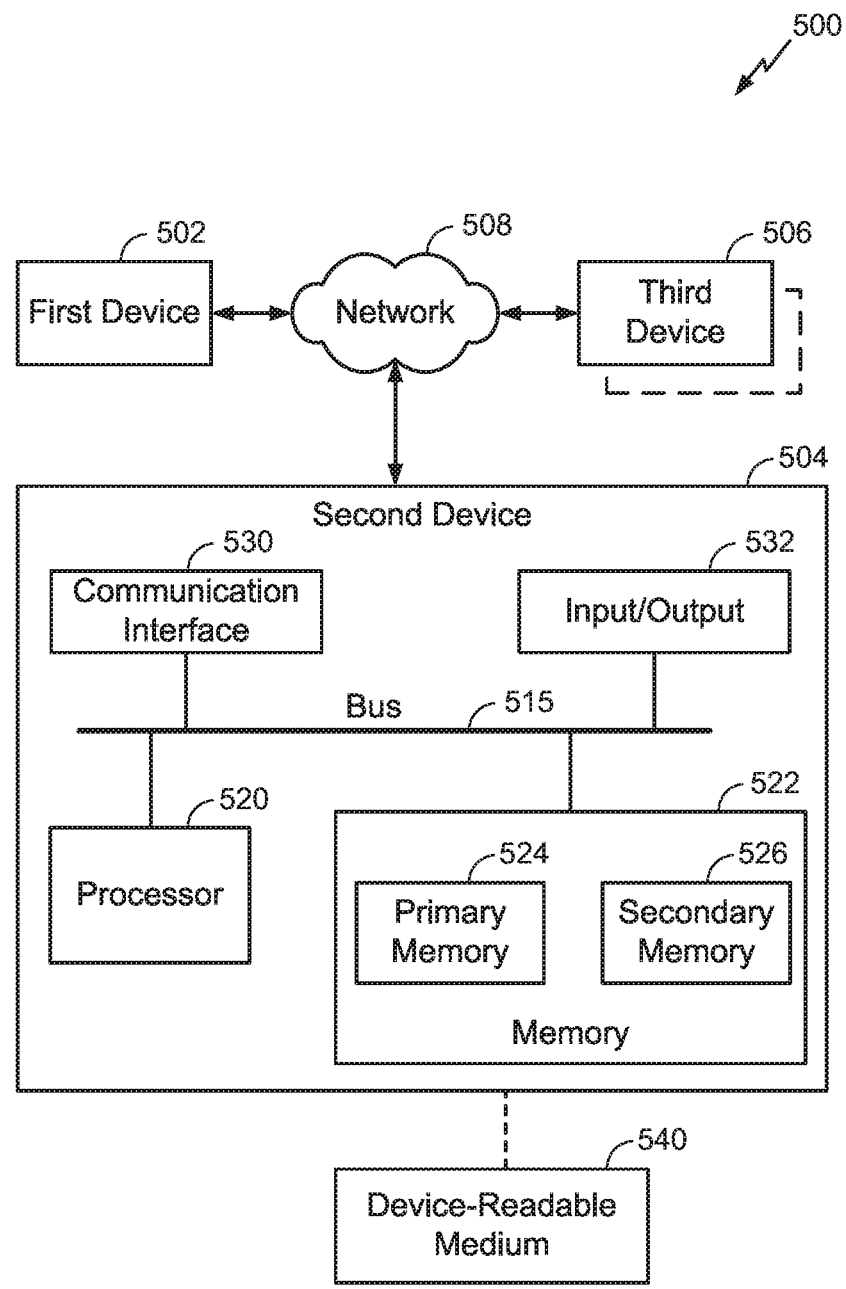
FIG. 5 is a schematic diagram illustrating an implementation of an example computing environment associated with a process to map key values to hash table entries according to an embodiment.

In one example embodiment, as shown in FIG. 5, a system embodiment may comprise a local network (e.g., device 504 and medium 540) and/or another type of network, such as a computing and/or communications network. For purposes of illustration, therefore, FIG. 5 shows an embodiment 500 of a system that may be employed to implement either type or both types of networks. Network 508 may comprise one or more network connections, links, processes, services, applications, and/or resources to facilitate and/or support communications, such as an exchange of communication signals, for example, between a computing device, such as 502, and another computing device, such as 506, which may, for example, comprise one or more client computing devices and/or one or more server computing device. By way of example, but not limitation, network 508 may comprise wireless and/or wired communication links, telephone and/or telecommunications systems, Wi-Fi networks, Wi-MAX networks, the Internet, a local area network (LAN), a wide area network (WAN), or any combinations thereof.

Example devices in FIG. 5 may comprise features, for example, of a client computing device and/or a server computing device, in an embodiment. It is further noted that the term computing device, in general, whether employed as a client and/or as a server, or otherwise, refers at least to a processor and a memory connected by a communication bus. Likewise, in the context of the present patent application at least, this is understood to refer to sufficient structure within the meaning of 35 USC § 112 (f) so that it is specifically intended that 35 USC § 112 (f) not be implicated by use of the term "computing device" and/or similar terms; however, if it is determined, for some reason not immediately apparent, that the foregoing understanding cannot stand and that 35 USC § 112 (f), therefore, necessarily is implicated by the use of the term "computing device" and/or similar terms, then, it is intended, pursuant to that statutory section, that corresponding structure, material and/or acts for performing one or more functions be understood and be interpreted to be described at least in FIGS. 3 and 4 and in the text associated with the foregoing figure(s) of the present patent application.

Referring now to FIG. 5, in an embodiment, first and third devices 502 and 506 may be capable of rendering a graphical user interface (GUI) for a network device and/or a computing device, for example, so that a user-operator may engage in system use. Device 504 may potentially serve a similar function in this illustration. Likewise, in FIG. 5, computing device 502 ('first device' in figure) may interface with computing device 504 ('second device' in figure), which may, for example, also comprise features of a client computing device and/or a server computing device, in an embodiment. Processor (e.g., processing device) 520 and memory 522, which may comprise primary memory 524 and secondary memory 526, may communicate by way of a communication bus 515, for example. The term "computing device," in the context of the present patent application, refers to a system and/or a device, such as a computing apparatus, that includes a capability to process (e.g., perform computations) and/or store digital content, such as electronic files, electronic documents, measurements, text, images, video, audio, etc. in the form of signals and/or states. Thus, a computing device, in the context of the present patent application, may comprise hardware, software, firmware, or any combination thereof (other than software per se). Computing device 504, as depicted in FIG. 5, is merely one example, and claimed subject matter is not limited in scope to this particular example.

For one or more embodiments, a device, such as a computing device and/or networking device, may comprise, for example, any of a wide range of digital electronic devices, including, but not limited to, desktop and/or notebook computers, high-definition televisions, digital versatile disc (DVD) and/or other optical disc players and/or recorders, game consoles, satellite television receivers, cellular telephones, tablet devices, wearable devices, personal digital assistants, mobile audio and/or video playback and/or recording devices, Internet of Things (IOT) type devices, or any combination of the foregoing. Further, unless specifically stated otherwise, a process as described, such as with reference to flow diagrams and/or otherwise, may also be executed and/or affected, in whole or in part, by a computing device and/or a network device. A device, such as a computing device and/or network device, may vary in terms of capabilities and/or features. Claimed subject matter is intended to cover a wide range of potential variations. For example, a device may include a numeric keypad and/or other display of limited functionality, such as a monochrome liquid crystal display (LCD) for displaying text, for example. In contrast, however, as another example, a web-enabled device may include a physical and/or a virtual keyboard, mass storage, one or more accelerometers, one or more gyroscopes, global positioning system (GPS) and/or other location-identifying type capability, and/or a display with a higher degree of functionality, such as a touch-sensitive color 5D or 3D display, for example.

As suggested previously, communications between a computing device and/or a network device and a wireless network may occur in accordance with known and/or to be developed network protocols including, for example, global system for mobile communications (GSM), enhanced data rate for GSM evolution (EDGE), 802.11b/g/n/h, etc., and/or worldwide interoperability for microwave access (WiMAX). A computing device and/or a networking device may also have a subscriber identity module (SIM) card, which, for example, may comprise a detachable or embedded smart card that is able to store subscription content of a user, and/or is also able to store a contact list. It is noted, however, that a SIM card may also be electronic, meaning that is may simply be stored in a particular location in memory of the computing and/or networking device. A user may own the computing device and/or network device or may otherwise be a user, such as a primary user, for example. A device may be assigned an address by a wireless network operator, a wired network operator, and/or an Internet Service Provider (ISP). For example, an address may comprise a domestic or international telephone number, an Internet Protocol (IP) address, and/or one or more other identifiers. In other embodiments, a computing and/or communications network may be embodied as a wired network, wireless network, or any combinations thereof.

A computing and/or network device may include and/or may execute a variety of now known and/or to be developed operating systems, derivatives and/or versions thereof, including computer operating systems, such as Windows, iOS, Linux, a mobile operating system, such as iOS, Android, Windows Mobile, and/or the like. A computing device and/or network device may include and/or may execute a variety of possible applications, such as a client software application enabling communication with other devices. For example, one or more messages (e.g., content) may be communicated, such as via one or more protocols, now known and/or later to be developed, suitable for communication of email, short message service (SMS), and/or multimedia message service (MMS), including via a network, such as a social network, formed at least in part by a portion of a computing and/or communications network, including, but not limited to, Facebook, LinkedIn, Twitter, and/or Flickr, to provide only a few examples. A computing and/or network device may also include executable computer instructions to process and/or communicate digital content, such as, for example, textual content, digital multimedia content, and/or the like. A computing and/or network device may also include executable computer instructions to perform a variety of possible tasks, such as browsing, searching, playing various forms of digital content, including locally stored and/or streamed video, and/or games such as, but not limited to, fantasy sports leagues. The foregoing is provided merely to illustrate that claimed subject matter is intended to include a wide range of possible features and/or capabilities.

In FIG. 5, computing device 502 may provide one or more sources of executable computer instructions in the form physical states and/or signals (e.g., stored in memory states), for example. Computing device 502 may communicate with computing device 504 by way of a network connection, such as via network 508, for example. As previously mentioned, a connection, while physical, may not necessarily be tangible. Although computing device 504 of FIG. 5 shows various tangible, physical components, claimed subject matter is not limited to a computing devices having only these tangible components as other implementations and/or embodiments may include alternative arrangements that may comprise additional tangible components or fewer tangible components, for example, that function differently while achieving similar results. Rather, examples are provided merely as illustrations. It is not intended that claimed subject matter be limited in scope to illustrative examples.

Memory 522 may comprise any non-transitory storage mechanism. Memory 522 may comprise, for example, primary memory 524 and secondary memory 526, additional memory circuits, mechanisms, or combinations thereof may be used. Memory 522 may comprise, for example, random access memory, read only memory, etc., such as in the form of one or more storage devices and/or systems, such as, for example, a disk drive including an optical disc drive, a tape drive, a solid-state memory drive, etc., just to name a few examples.

Memory 522 may be utilized to store a program of executable computer instructions. For example, processor 520 may fetch executable instructions from memory and proceed to execute the fetched instructions. Memory 522 may also comprise a memory controller for accessing device readable-medium 540 that may carry and/or make accessible digital content, which may include code, and/or instructions, for example, executable by processor 520 and/or some other device, such as a controller, as one example, capable of executing computer instructions, for example. Under direction of processor 520, a non-transitory memory, such as memory cells storing physical states (e.g., memory states), comprising, for example, a program of executable computer instructions, may be executed by processor 520 and able to generate signals to be communicated via a network, for example, as previously described. Generated signals may also be stored in memory, also previously suggested.

Memory 522 may store electronic files and/or electronic documents, such as relating to one or more users, and may also comprise a computer-readable medium that may carry and/or make accessible content, including code and/or instructions, for example, executable by processor 520 and/or some other device, such as a controller, as one example, capable of executing computer instructions, for example. As previously mentioned, the term electronic file and/or the term electronic document are used throughout this document to refer to a set of stored memory states and/or a set of physical signals associated in a manner so as to thereby form an electronic file and/or an electronic document. That is, it is not meant to implicitly reference a particular syntax, format and/or approach used, for example, with respect to a set of associated memory states and/or a set of associated physical signals. It is further noted an association of memory states, for example, may be in a logical sense and not necessarily in a tangible, physical sense. Thus, although signal and/or state components of an electronic file and/or electronic document, are to be associated logically, storage thereof, for example, may reside in one or more different places in a tangible, physical memory, in an embodiment.

Algorithmic descriptions and/or symbolic representations are examples of techniques used by those of ordinary skill in the signal processing and/or related arts to convey the substance of their work to others skilled in the art. An algorithm is, in the context of the present patent application, and generally, is considered to be a self-consistent sequence of operations and/or similar signal processing leading to a desired result. In the context of the present patent application, operations and/or processing involve physical manipulation of physical quantities. Typically, although not necessarily, such quantities may take the form of electrical and/or magnetic signals and/or states capable of being stored, transferred, combined, compared, processed and/or otherwise manipulated, for example, as electronic signals and/or states making up components of various forms of digital content, such as signal measurements, text, images, video, audio, etc.

It has proven convenient at times, principally for reasons of common usage, to refer to such physical signals and/or physical states as bits, values, elements, parameters, symbols, characters, terms, numbers, numerals, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically in the form of physical electronic and/or magnetic quantities, within memories, registers, and/or other storage devices, processing devices, and/or display devices of the special purpose computer and/or similar special purpose computing and/or network device. In the context of this particular patent application, as mentioned, the term "specific apparatus" therefore includes a general purpose computing and/or network device, such as a general purpose computer, once it is programmed to perform particular functions, such as pursuant to program software instructions.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation. Likewise, a physical change may comprise a transformation in molecular structure, such as from crystalline form to amorphous form or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state from a binary one to a binary zero or vice-versa in a memory device may comprise a transformation, such as a physical, but non-transitory, transformation. Rather, the foregoing is intended as illustrative examples.

Referring again to FIG. 5, processor 520 may comprise one or more circuits, such as digital circuits, to perform at least a portion of a computing procedure and/or process. By way of example, but not limitation, processor 520 may comprise one or more processors, such as controllers, microprocessors, microcontrollers, application specific integrated circuits, digital signal processors, programmable logic devices, field programmable gate arrays, the like, or any combination thereof. In various implementations and/or embodiments, processor 520 may perform signal processing, typically substantially in accordance with fetched executable computer instructions, such as to manipulate signals and/or states, to construct signals and/or states, etc., with signals and/or states generated in such a manner to be communicated and/or stored in memory, for example.

FIG. 5 also illustrates device 504 as including a component 532 operable with input/output devices, for example, so that signals and/or states may be appropriately communicated between devices, such as device 504 and an input device and/or device 504 and an output device. A user may make use of an input device, such as a computer mouse, stylus, track ball, keyboard, and/or any other similar device capable of receiving user actions and/or motions as input signals. Likewise, for a device having speech to text capability, a user may speak to a device to generate input signals. A user may make use of an output device, such as a display, a printer, etc., and/or any other device capable of providing signals and/or generating stimuli for a user, such as visual stimuli, audio stimuli and/or other similar stimuli.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

What is claimed is:

1. A method comprising:
applying a first hash operation from a plurality of concurrently executing hash operations as a primary hash operation to map key values in a first portion of a sequence of key values to map key values in the first portion of the sequence of key values to entries in a hash table to be accessed; and
selecting a second hash operation from the plurality of concurrently executing hash operations to replace the first hash operation to be the primary hash operation to map key values in the sequence of key values in a second portion of the sequence of key values that is subsequent to the first portion of the sequence of key values based, at least in part, on an indicator of collision performance of the first hash operation in mapping the key values in the first portion of the sequence of key values and an indicator of collision performance of the second hash operation in mapping the key values in the first portion of the sequence of key values.

2. The method of claim 1, and further comprising:
for one or more of the plurality of concurrently executing hash operations, maintaining a score indicative of collision performance in mapping key values of the sequence of key values to entries in the hash table, and wherein selecting the second hash operation further comprises comparing a score indicative of collision performance of the first hash operation in mapping the key values in the first portion of the sequence of key values with a score indicative of collision performance of at least the second hash operation of the plurality of concurrently executing hash operations in mapping the key values in the first portion of the sequence of key values.

3. The method of claim 2, and further comprising:
selecting the second hash operation from among the plurality of concurrently executing hash operations to replace the first hash operation as the primary hash operation based, at least in part, on a comparison of a first collision score associated with the first hash operation and a second collision score associated with the second hash operation.

4. The method of claim 2, and further comprising:
selecting the second hash operation from among the plurality of concurrently executing hash operations to replace the first hash operation as the primary hash operation responsive to a difference between a first collision score associated with the first hash operation and a second collision score associated with the second hash operation maintained over a set number of cycles to access the entries in the hash table.

5. The method of claim 1, wherein the hash table is maintained in one or more non-transitory memory devices, and wherein entries in the hash table are to be accessed by operations to write a parameter and/or value to or read a parameter and/or value from the entries in the hash table.

6. The method of claim 1, wherein the indicator of collision performance is based, at least in part, on a count of mappings of key values in the sequence of key values by the second hash operation to a same hash table entry.

7. The method of claim 6, and further comprising:
for at least one of the plurality of concurrently executing hash operations, maintaining an array of values and/or parameters, the values and/or parameters being indicative of a count of mappings of key values to a corresponding hash table entry by the at least one of the plurality of concurrently executing hash operations.

8. The method of claim 1, and further comprising:
mapping a key value in the sequence of key values to an entry in the hash table according to the second hash operation; and
performing a branch prediction operation based, at least in part, on a value obtained from the entry in the hash table.

9. The method of claim 1, and further comprising:
mapping a key value to an entry in the hash table according to the second hash operation; and
performing a branch prediction operation based, at least in part, on a value obtained from the entry in the hash table.

10. An apparatus comprising:
a non-transitory memory device to comprise a hash table; and
a processor to:
apply a first hash operation from a plurality of concurrently executing hash operations as a primary hash operation to map key values in a first portion of a sequence of key values to map key values in the first portion of the sequence of key values to entries in a hash table to be accessed;
select a second hash operation from the plurality of concurrently executing hash operations to replace the first hash operation to be the primary hash operation to map key values in the sequence of key values in a second portion of the sequence of key values that is subsequent to the first portion of the sequence based, at least in part, on an indicator of collision performance of the second hash operation in mapping the key values in the first portion of the sequence of key values and an indicator of collision performance of the second hash operation in mapping the key values in the first portion of the sequence of key values.

11. The apparatus of claim 10, and wherein the processor is further to:
maintain a score, for one or more of the plurality of concurrently executing hash operations, indicative of collision performance in mapping key values of a sequence of key values to entries in the hash table; and
select the second hash operation to replace the first hash operation as the primary hash operation further based, at least in part, on a comparison of a first score indicative of collision performance of the first hash operation with a second score indicative of collision performance of at least the second hash operation of the plurality of concurrently executing hash operations.

12. The apparatus of claim 11, wherein the processor further to select the second hash operation from among the plurality of concurrently executing hash operations to replace the first hash operation as the primary hash operation based, at least in part, on a comparison of a first collision score associated with the first hash operation and a second collision score associated with the second hash operation.

13. The apparatus of claim 11, wherein the processor further to select the second hash operation from among the plurality of concurrently executing hash operations to be the primary hash operation responsive to a difference between a first collision score associated with the first hash operation and second collision score associated with the second hash operation maintained over a set number of cycles to access the entries in the hash table.

14. The apparatus of claim 10, wherein entries in the hash table to be accessed by operations to write a parameter and/or value to or read a parameter and/or value from the entries in the hash table.

15. The apparatus of claim 10, wherein the indicator of collision performance to be based, at least in part, on a count of mappings of key values in the sequence of key values by the second hash operation to a same hash table entry.

16. The apparatus of claim 15, and further comprising:
for at least one of the plurality of concurrently executing hash operations, the non-transitory memory device to maintain an array of values and/or parameters, the values and/or parameters to be indicative of a count of mappings of key values to a corresponding hash table entry by the at least one of the plurality of concurrently executing hash operations.

17. The apparatus of claim 10, wherein the processor is further to:
map a key value to an entry in the hash table according to the second hash operation; and
perform a branch prediction operation based, at least in part, on a value obtained from the entry in the hash table.

18. The apparatus of claim 10, wherein the processor further to:
map a key value to an entry in the hash table according to the second hash operation; and
perform a branch prediction operation based, at least in part, on a value obtained from the entry in the hash table.

19. An article comprising:
a storage medium comprising a non-transitory memory comprising computer-readable instructions stored thereon, the computer-readable instructions to be executable by one or more processors of a computing device to:
apply a first hash operation from a plurality of concurrently executing hash operations as a primary hash operation to map key values in a first portion of a sequence of key values to map key values in the first portion of the sequence of key values to entries in a hash table to be accessed; and
select a second hash operation from the plurality of concurrently executing hash operations to replace the first hash operation from the plurality of concurrently executing hash operations to be the primary hash operation to map key values in the sequence of key values in a second portion of the sequence of key values subsequent to the first portion of the sequence based, at least in part, on an indicator of collision performance of the second hash operation in mapping the key values in the first portion of the sequence of key values and an indicator of collision performance of the second hash operation in mapping the key values in the first portion of the sequence of key values.

20. The method of claim 1, wherein the plurality of concurrently executing hash operations concurrently map key values to the entries of the hash table.

\* \* \* \* \*